(12) United States Patent
Lee (10) Patent No.: US 11,691,590 B2
(45) Date of Patent: Jul. 4, 2023

(54) SEAT BELT MOUNTING BRACKET MOUNTING STRUCTURE

(71) Applicants: HYUNDAI MOTOR COMPANY, Seoul (KR); Kia Corporation, Seoul (KR)

(72) Inventor: Haehoon Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/542,231

(22) Filed: Dec. 3, 2021

(65) Prior Publication Data

US 2022/0281406 A1    Sep. 8, 2022

(30) Foreign Application Priority Data

Mar. 8, 2021    (KR) .......................... 10-2021-0030322

(51) Int. Cl.
  *B60R 22/24*    (2006.01)
(52) U.S. Cl.
  CPC .................................... *B60R 22/24* (2013.01)
(58) Field of Classification Search
  CPC ................................................... B62D 25/04
  See application file for complete search history.

(56) References Cited

U.S. PATENT DOCUMENTS

| | | | | |
|---|---|---|---|---|
| 2011/0254317 A1 * | 10/2011 | Nakamura | .............. | B60R 22/18 |
| | | | | 296/193.06 |
| 2012/0119477 A1 * | 5/2012 | Kim | ...................... | B62D 25/04 |
| | | | | 296/193.06 |

FOREIGN PATENT DOCUMENTS

| | | | | | | |
|---|---|---|---|---|---|---|
| CN | 102219029 | A | * | 10/2011 | ............. | B60R 22/18 |
| CN | 210734087 | U | * | 6/2020 | | |
| DE | 102006013649 | A1 | * | 9/2007 | ............. | B60R 22/24 |
| DE | 102011017139 | B4 | * | 3/2015 | ............. | B60R 22/18 |
| JP | 2000001156 | A | * | 1/2000 | ........... | B60R 22/023 |
| JP | 4045773 | B2 | * | 2/2008 | | |
| JP | 2011025849 | A | * | 2/2011 | | |
| JP | 2013082371 | A | * | 5/2013 | | |
| JP | 5339526 | B2 | * | 11/2013 | | |
| JP | 2015196467 | A | * | 11/2015 | | |
| KR | 930001467 | Y1 | * | 3/1993 | | |
| KR | 19980033763 | U | * | 9/1998 | | |
| KR | 19980057246 | U | * | 10/1998 | | |
| KR | 101458705 | B1 | * | 11/2014 | | |
| KR | 101508879 | B1 | * | 4/2015 | | |
| WO | WO-2016021051 | A1 | * | 2/2016 | ............. | B60R 22/24 |

\* cited by examiner

*Primary Examiner* — Nicole T Verley (74) *Attorney, Agent, or Firm* — Morgan, Lewis & Bockius LLP (57) ABSTRACT

A seat belt mounting bracket mounting structure includes a pillar portion, a connecting member connecting the pillar portion and another forward pillar portion positioned in front of the vehicle body of the pillar portion, and a seat belt mounting bracket mounted at a cross position of the pillar portion and the connecting member.

13 Claims, 7 Drawing Sheets

SEAT BELT MOUNTING BRACKET MOUNTING STRUCTURE

CROSS-REFERENCE TO RELATED APPLICATION

The present application claims priority to Korean Patent Application No. 10-2021-0030322 filed on Mar. 8, 2021, the entire contents of which is incorporated herein for all purposes by this reference.

BACKGROUND OF THE INVENTION

Field of the Invention

The present invention relates to a seat belt mounting bracket mounting structure. More particularly, the present invention relates to a seat belt mounting bracket capable of increasing the strength of a pillar as well as having a mount function of the seat belt mounting bracket.

Description of Related Art

A seat belt mounting bracket is a configuration for mounting a seat belt, typically coupled to a pillar member.

However, a general seat belt mounting bracket is mounted on a pillar internal member and is not connected to other main members.

That is, the general seat belt mounting bracket has insufficient connection with other members, so the structure efficiency deteriorates, and the structure reinforcement effect is insufficient as it is a single function part.

The general seat belt mounting bracket is an open structure which is simply connected to the top portion and bottom inside the pillar member, and it does not contribute much to the structure strength.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seat belt mounting bracket mounting structure that increases the structure strength by connecting other members in addition to the function of mounting the seat belt.

Furthermore, the present invention is directed to providing a seat belt mounting bracket mounting structure that increases the structure efficiency through the upper and lower connection inside the member and increases the vehicle body strength.

A seat belt mounting bracket mounting structure according to various exemplary embodiments of the present invention may include a pillar portion, a connecting member connecting the pillar portion and another forward pillar portion positioned in front of the vehicle body of the pillar portion, and a seat belt mounting bracket mounted at a cross position of the pillar portion and the connecting member.

The pillar portion may include a pillar reinforcement provided outside the vehicle body, and a pillar internal upper provided inside the vehicle body, and the seat belt mounting bracket may connect the pillar reinforcement and the pillar internal upper.

The seat belt mounting bracket may include a main surface that closes an internal space formed by the pillar reinforcement and the pillar internal upper.

The seat belt mounting bracket may further include a reinforcement surface which is curved from the main surface and engaged with the pillar reinforcement.

The pillar reinforcement may include a reinforcement rear surface disposed behind the vehicle body, and a reinforcement side surface curved from the reinforcement rear surface.

The reinforcement surface may include a bracket rear surface connected to the reinforcement rear surface, and a bracket side surface connected to the reinforcement side surface.

The seat belt mounting bracket may include a rear flange which is curved at the bracket rear surface and connected to the pillar internal upper, and a side flange which is curved at the bracket side surface and connected to the pillar internal upper.

The connecting member may be connected to the side flange.

The pillar reinforcement may include a pillar reinforcement lower, and a pillar reinforcement upper coupled to the pillar reinforcement lower.

The upper portion of the pillar reinforcement lower and the lower portion of the pillar reinforcement upper partially may overlap and the bracket rear surface and the bracket side surface may be connected to an overlapped portion of the pillar reinforcement lower and the pillar reinforcement upper.

The seat belt mounting bracket may further include a main flange which is curved from the main surface and connected to the pillar internal upper.

A mounting hole may be formed in the main flange.

The main flange may include a stepped portion stepped around the mounting hole.

According to the seat belt mounting bracket mounting structure according to various exemplary embodiments of the present invention, it is possible to increase the structure strength by connecting other members in addition to the function of mounting the seat belt.

Furthermore, for the effects which may be obtained or predicted due to various exemplary embodiments of the present invention, it is to be included directly or implicitly in the detailed description of various exemplary embodiments of the present invention. That is, various effects predicted according to various exemplary embodiments of the present invention will be included within a detailed description to be described later.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present application will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly explain various exemplary embodiments of the present invention, parts irrelevant to the description are omitted, and the same reference numerals are assigned to the same or similar elements throughout the specification.

Since the size and thickness of each component shown in the drawings are arbitrarily indicated for convenience of description, the present invention is not necessarily limited to that shown in the drawings, and the thickness is enlarged to clearly express various parts and regions.

Furthermore, in the following detailed description, the names of the components include first, second, and the like to distinguish them in the same relationship, and the order is not necessarily limited in the following description.

Throughout the specification, when a part includes a certain component, it means that other components may be further included, rather than excluding other components, unless otherwise stated.

Furthermore, terms such as . . . ~part, ~portion, . . . means described in the specification mean a unit of a comprehensive configuration that performs at least one function or operation.

When a part, such as a layer, film, region, plate, etc., is "on" another part, it includes not only the case where it is directly above the other part, but also the case where there is another part in between.

In contrast, when an element is referred to as being "directly on" another element, there are no intervening elements present.

Various exemplary embodiments of the present invention will hereinafter be described in detail with reference to the accompanying drawings.

Figure 1:
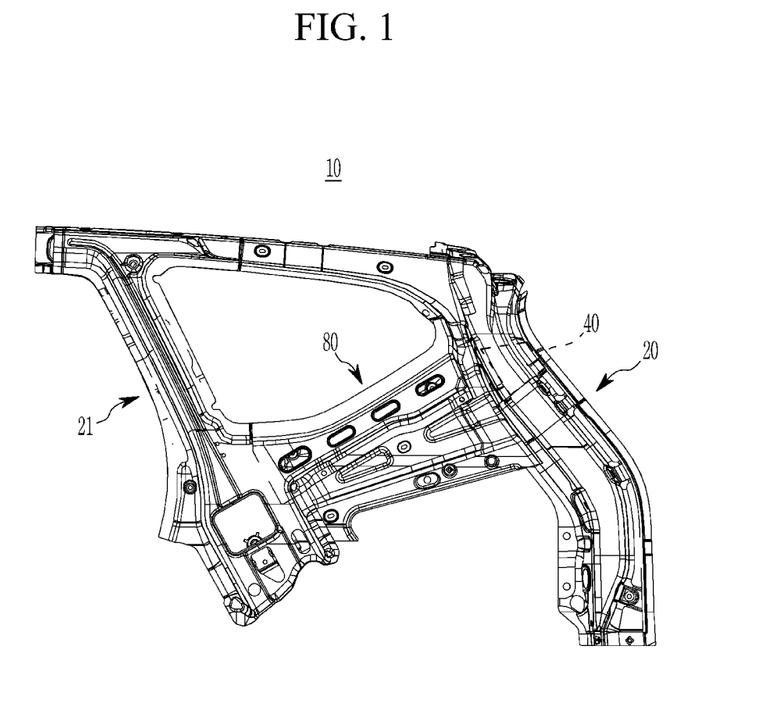
FIG. 1 is a side view of a seat belt mounting bracket mounting structure according to various exemplary embodiments of the present invention.

FIG. 1 is a side view of a seat belt mounting bracket mounting structure according to various exemplary embodiments of the present invention.

Referring to FIG. 1, a seat belt mounting bracket mounting structure 10 according to various exemplary embodiments of the present invention may include a pillar portion 20, a connecting member 80 connecting the pillar portion 20 and another forward pillar portion 21 positioned in front of the vehicle body of the pillar portion 20, and a seat belt mounting bracket 40 mounted at the cross position of the pillar portion 20 and the connecting member 80.

Here, the pillar portion 20 may be a C-pillar or D-pillar disposed at the rear of the vehicle body, and the forward pillar portion 21 may be a B-pillar or C-pillar disposed at the front of the pillar portion 20.

Figure 2:
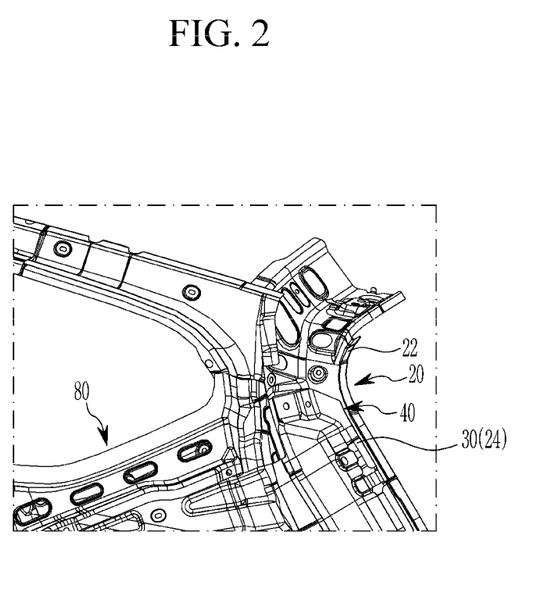
FIG. 2 is a partial perspective view of a seat belt mounting bracket mounting structure according to various exemplary embodiments of the present invention.
Figure 3:
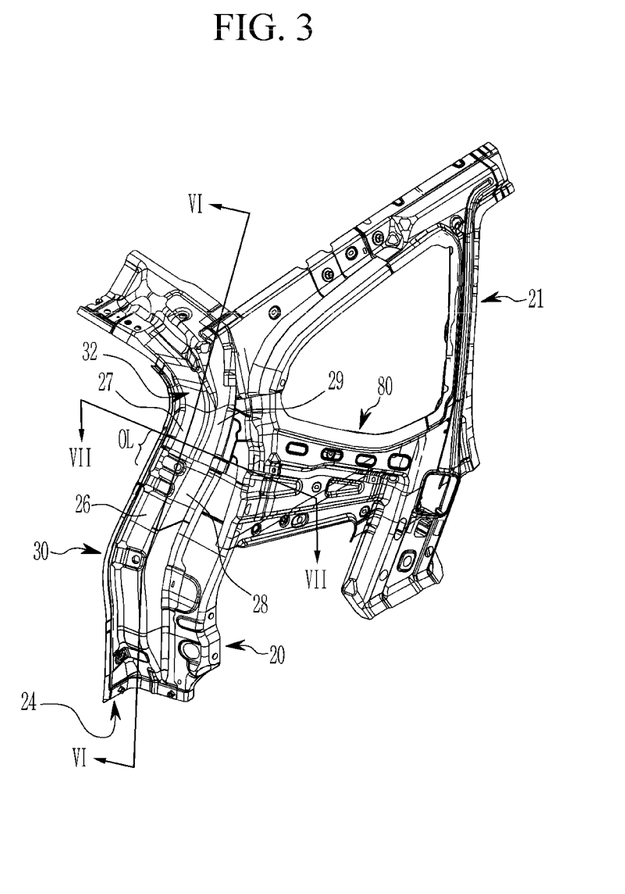
FIG. 3 is a perspective view of the seat belt mounting bracket mounting structure according to various exemplary embodiments of the present invention viewed from the rear of the vehicle body.

FIG. 2 is a partial perspective view of a seat belt mounting bracket mounting structure according to various exemplary embodiments of the present invention, and FIG. 3 is a perspective view of the seat belt mounting bracket mounting structure according to various exemplary embodiments of the present invention viewed from the rear of the vehicle body.

Referring to FIG. 1 to FIG. 3, the pillar portion 20 includes a pillar reinforcement 24 provided outside the vehicle body, and a pillar internal upper 22 provided inside the vehicle body, and the seat belt mounting bracket 40 may connect the pillar reinforcement 24 and the pillar internal upper 22.

Figure 4:
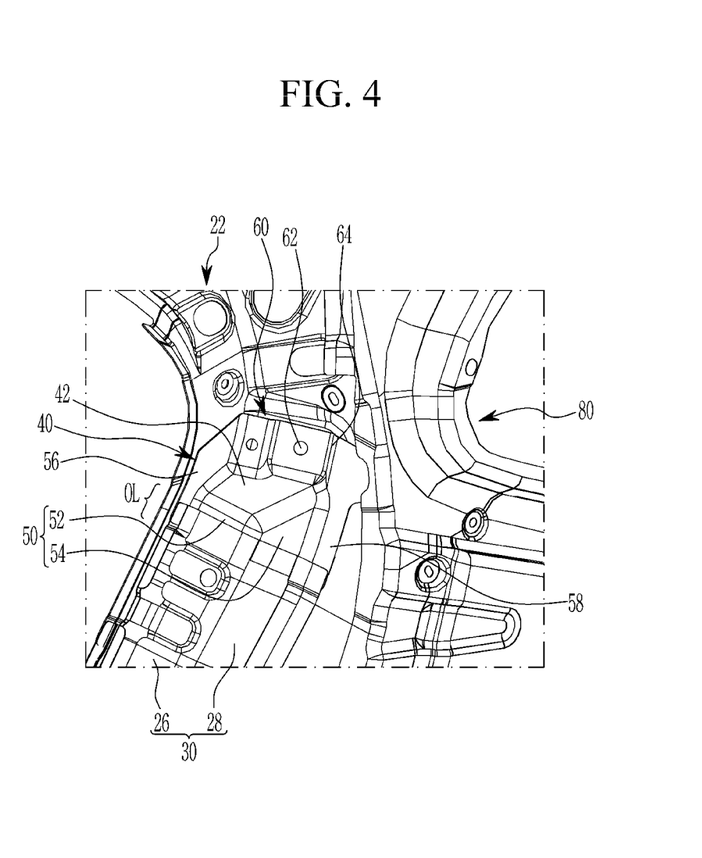
FIG. 4 is a perspective view of the seat belt mounting bracket mounting structure according to various exemplary embodiments of the present invention except for a pillar reinforcement upper in FIG. 3.
Figure 5:
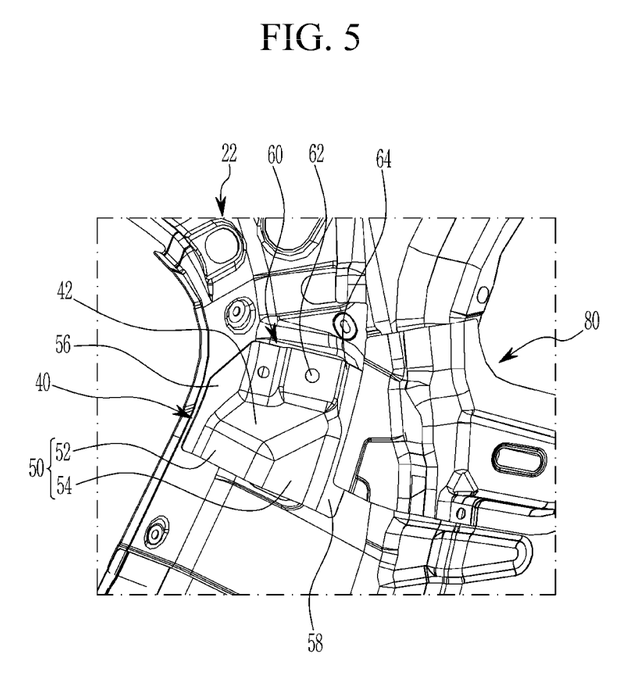
FIG. 5 is a perspective view of the seat belt mounting bracket mounting structure according to various exemplary embodiments of the present invention except for a pillar reinforcement lower in FIG. 4.

FIG. 4 is a perspective view of the seat belt mounting bracket mounting structure according to various exemplary embodiments of the present invention except for a pillar reinforcement upper in FIG. 3, and FIG. 5 is a perspective view of the seat belt mounting bracket mounting structure according to various exemplary embodiments of the present invention except for a pillar reinforcement lower in FIG. 4.

Figure 6:
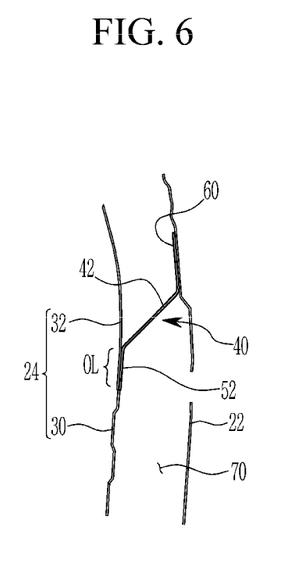
FIG. 6 is a cross-sectional view along the line VI-VI of FIG. 3.
Figure 7:
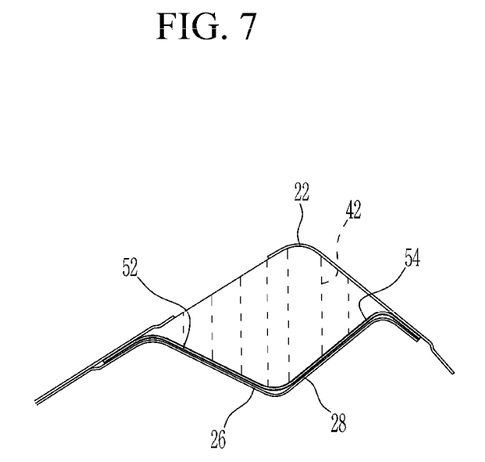
FIG. 7 is a cross-sectional view along the line VII-VII of FIG. 3.

FIG. 6 is a cross-sectional view along the line VI-VI of FIG. 3, and FIG. 7 is a cross-sectional view along the line VII-VII of FIG. 3.

Referring to FIG. 1 to FIG. 6, the seat belt mounting bracket 40 may include a main surface 42 that closes an internal space 70 formed by the pillar reinforcement 24 and the pillar internal upper 22.

A general seat belt mounting bracket is a configuration which is combined with an anchorage of a seat belt, is mounted on the pillar internal member, and is not connected to other main members, so it may be independent of the strength of other members.

However, as shown in FIG. 6 and FIG. 7, the seat belt mounting bracket 40 according to the exemplary embodiment of the present invention is disposed across the internal space 70 formed by the filler reinforcement 24 and the filler internal upper 22, and the seat belt mounting bracket 40 may connect the filler reinforcement 24 and the filler internal upper 22. Accordingly, the seat belt mounting bracket 40 is coupled to the anchorage of the seat belt, and may be configured to increase the rigidity of the pillar portion 20.

The seat belt mounting bracket 40 may further include a reinforcement surface 50 (see FIG. 4 and FIG. 5) which is curved from the main surface 42 and engaged with the pillar reinforcement 24.

The pillar reinforcement 24 may include reinforcement rear surfaces 26, and 27 (see FIG. 3) disposed on the rear of the vehicle body, and reinforcement side surfaces 28, and 29 formed to be curved from the reinforcement rear surfaces 26, and 27.

The reinforcement surface 50 may include a bracket rear surface 52 connected to the reinforcement rear surfaces 26, and 27, and a bracket side surface 54 connected to the reinforcement side surfaces 28, and 29.

The reinforcement rear surfaces 26, and 27 and the bracket rear surfaces 52 may be welded together, and the reinforcement side surfaces 28, and 29 and the bracket side surface 54 may also be joined by welding.

The seat belt mounting bracket 40 may include a rear flange 56, which is curved at the bracket rear surface 52 and connected to the pillar internal upper 22, and a side flange 58 which is curved at the bracket side surface 54 and connected to the pillar internal upper 22.

The connecting member 80 may be connected to the side flange 58.

That is, the seat belt mounting bracket 40 may connect the pillar reinforcement 24, the pillar internal upper 22 and the connecting member 80 to increase the connection strength between each member.

Referring to FIG. 6, the pillar reinforcement 24 may include a pillar reinforcement lower 30, and a pillar reinforcement upper 32 coupled to the pillar reinforcement lower 30.

Referring to FIG. 4 and FIG. 6, the upper portion of the pillar reinforcement lower 30 and the lower portion of the pillar reinforcement upper 32 partially overlap OL, and the bracket rear surface 52 and the bracket side surface 54 may be joined to the overlapped portion OL of the pillar reinforcement lower 30 and the pillar reinforcement upper 32.

That is, the upper portion of the rear surface 26 of the pillar reinforcement lower 30 and the lower portion of the rear surface 27 of the pillar reinforcement upper 32 may be overlapped and welded, and the upper portion of the side surface 28 of the pillar reinforcement lower 30 and the lower portion of the side surface 29 of the pillar reinforcement upper 32 may be overlapped and welded (see FIG. 3).

The bracket rear surface 52 and the bracket side surface 54 may be welded to the overlapped portion OL of the pillar reinforcement lower 30 and the pillar reinforcement upper 32, respectively. Therefore, the connection strength of the pillar reinforcement 24 and the seat belt mounting bracket 40 may be increased.

Referring to FIG. 6, the seat belt mounting bracket 40 may further include a main flange 60 which is curved from the main surface 42 and connected to the pillar internal upper 22.

Referring to FIG. 5, a mounting hole 62 may be formed in the main flange 60, and an anchorage, not shown, may be mounted through the mounting hole 62.

The main flange 60 may include a stepped portion 64 stepped around the mounting hole 62. The stepped portion 64 may increase the strength around the mounting hole 62.

According to the seat belt mounting bracket mounting structure according to various exemplary embodiments of the present invention, in the internal space formed by the pillar reinforcement 24 and the pillar internal upper 22, the seat belt mounting bracket 40 forms a closed cross-section, facilitating mounting function and increasing vehicle body strength.

Furthermore, the seat belt mounting bracket mounting structure according to various exemplary embodiments of the present invention may be applied to the cross position of the pillar and pillar connecting members, contributing to load distribution in the event of a vehicle collision.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seat belt mounting bracket mounting structure comprising:
    a pillar portion;
    a connecting member connecting the pillar portion and a forward pillar portion positioned in front of a vehicle body of the pillar portion; and
    a seat belt mounting bracket mounted at a cross position of the pillar portion and the connecting member.

2. The seat belt mounting bracket mounting structure of claim 1, wherein the pillar portion includes:
    a pillar reinforcement provided outside the vehicle body; and
    a pillar internal upper provided inside the vehicle body;
    wherein the seat belt mounting bracket connects the pillar reinforcement and the pillar internal upper.

3. The seat belt mounting bracket mounting structure of claim 2,
    wherein the seat belt mounting bracket includes a main surface that closes an internal space formed by the pillar reinforcement and the pillar internal upper.

4. The seat belt mounting bracket mounting structure of claim 3,
    wherein the seat belt mounting bracket further includes a reinforcement surface which is curved from the main surface and engaged with the pillar reinforcement.

5. The seat belt mounting bracket mounting structure of claim 4, wherein the pillar reinforcement includes:
    a reinforcement rear surface disposed behind the vehicle body; and
    a reinforcement side surface curved from the reinforcement rear surface.

6. The seat belt mounting bracket mounting structure of claim 5, wherein the reinforcement surface includes:
- a bracket rear surface connected to the reinforcement rear surface; and
- a bracket side surface connected to the reinforcement side surface.

7. The seat belt mounting bracket mounting structure of claim 6, wherein the seat belt mounting bracket includes:
- a rear flange curved at the bracket rear surface and connected to the pillar internal upper; and
- a side flange curved at the bracket side surface and connected to the pillar internal upper.

8. The seat belt mounting bracket mounting structure of claim 7, wherein the connecting member is connected to the side flange.

9. The seat belt mounting bracket mounting structure of claim 6, wherein the pillar reinforcement includes:
- a pillar reinforcement lower; and
- a pillar reinforcement upper coupled to the pillar reinforcement lower.

10. The seat belt mounting bracket mounting structure of claim 9,
- wherein an upper portion of the pillar reinforcement lower and a lower portion of the pillar reinforcement upper partially overlap, and
- wherein the bracket rear surface and the bracket side surface are connected to an overlapped portion of the pillar reinforcement lower and the pillar reinforcement upper.

11. The seat belt mounting bracket mounting structure of claim 3,
- wherein the seat belt mounting bracket further includes a main flange which is curved from the main surface and connected to the pillar internal upper.

12. The seat belt mounting bracket mounting structure of claim 11,
- wherein a mounting hole is formed in the main flange.

13. The seat belt mounting bracket mounting structure of claim 11,
- wherein the main flange includes a stepped portion stepped around the mounting hole.

* * * * *